United States Patent [19]

Thuries et al.

[11] Patent Number: 4,884,166
[45] Date of Patent: Nov. 28, 1989

[54] ELECTRICITY STATION

[75] Inventors: Edmond Thuries, Pusignan; Jean-Paul Masson, Villeurbanne, both of France

[73] Assignee: Societe Anonyme dite : Alsthom, Paris Cedex, France

[21] Appl. No.: 227,933

[22] Filed: Aug. 3, 1988

[30] Foreign Application Priority Data

Aug. 3, 1987 [FR] France .................................. 87 10987

[51] Int. Cl.$^4$ ............................................. H02B 5/00
[52] U.S. Cl. ................................................... 361/333
[58] Field of Search ............... 361/333, 335, 337, 338; 200/148

[56] References Cited

U.S. PATENT DOCUMENTS 4,092,547  5/1978  Ruppert ............................. 361/333
4,360,849  11/1982  Harris et al. ....................... 361/333

Primary Examiner—Roy N. Envall, Jr.
Attorney, Agent, or Firm—Sughrue, Mion, Zinn, Macpeak & Seas

[57] ABSTRACT

An electricity station for coupling at least one air-insulated electric line to output feedthroughs from at least one set of three-phase busbars via, in particular, section switches and circuit breakers, the station being characterized in that the circuit breakers (5, 6) are of conventional type, the section switches (71, 72, 81, 82) are of telescopic type, and at least one set of busbars (3, 4) is of the metal-clad type including a sheath containing dielectric gas under pressure.

6 Claims, 4 Drawing Sheets

FIG.10
FIG.11
FIG.12
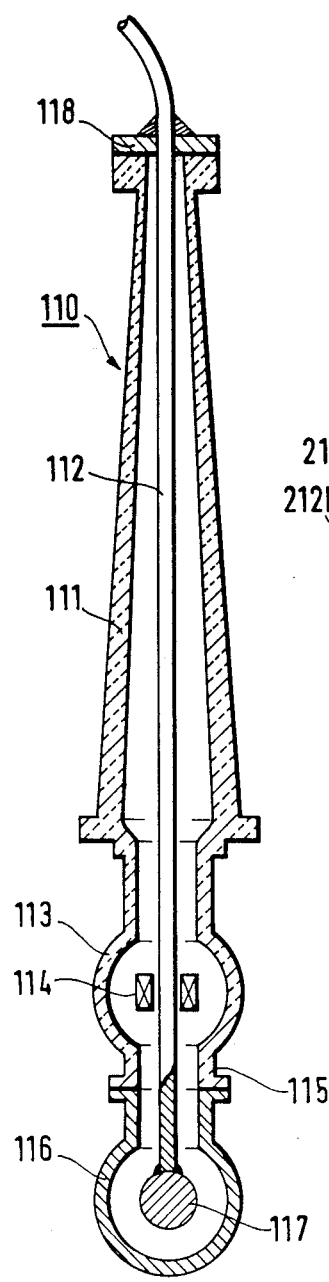
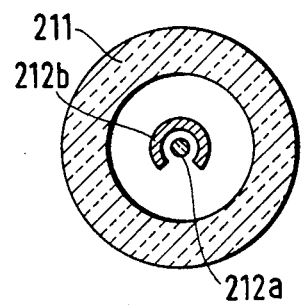
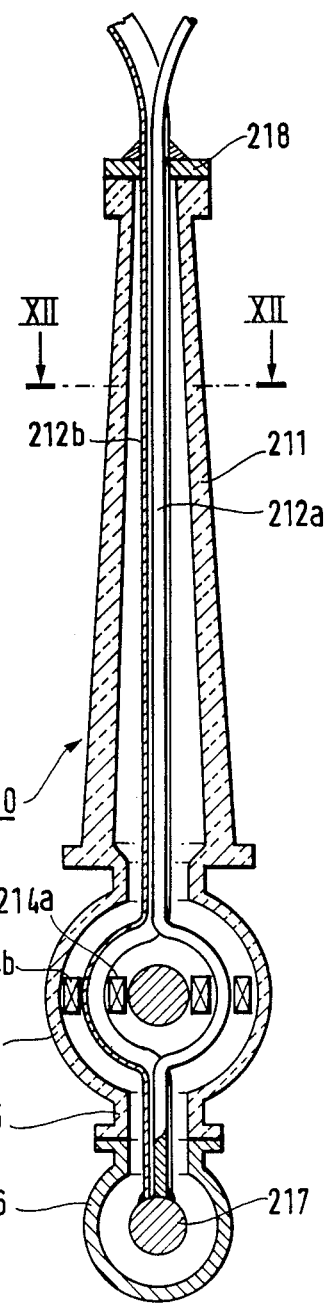

ELECTRICITY STATION

The present invention relates to a high tension electricity transmission station.

BACKGROUND OF THE INVENTION

Two types of transmission station are known: "conventional" or outdoor stations; and "metal-clad" stations.

Conventional stations include apparatuses which are all interconnected by connections in air.

They have the advantage of making it possible to see when a section switch is open, and of occupying large working volumes with large safety distances which facilitate manual intervention by personnel.

They suffer from the drawback of occupying a large area on the ground and this is a serious drawback in the vicinity of towns where land prices are continually rising.

In metal-clad stations, connections are provided by busbars placed inside gas-tight tubes which are insulated by sulfur hexafluoride, and they occupy much less space.

However, they suffer from several drawbacks: the distances between apparatuses do not make manual intervention easy.

It is not possible to see whether a metal-clad section switch is in the open state or the closed state, and this is not favorable to personnel safety.

An object of the present invention is to provide a high tension electricity station occupying a smaller ground area than conventional type stations while retaining their qualities with respect to operation (visibly open circuits, considerable working and safety distances).

SUMMARY OF THE INVENTION

The present invention provides a hybrid outdoor electricity station for coupling at least one air-insulated electric transmission line to output through a circuit including at least one circuit breaker series connected with at least one section switch by means of at least one set of three phase busbars, the improvement wherein said circuit breakers are of outdoor type, said section switches are of telescopic open air types, said at least one set of busbars is of the metal-clad type including a sheath containing dielectric gas under pressure.

In one implementation, said line includes anchor points fixed on either side of a single central gantry disposed over the set of metal-clad bars.

The metal-clad bars may be connected to female connectors via gas-tight insulating feedthroughs fixed to the sheaths of the metal-clad bars and in communication with the sheaths.

BRIEF DESCRIPTION OF THE DRAWINGS

Embodiments of the invention are described by way of example with reference to the accompanying drawings, in which:

FIG. 10 is a diagrammatic axial section through a one-wire feedthrough used in a station in accordance with the invention;

FIG. 11 is a diagram of a two-wire feedthrough used in a station in accordance with the invention; and FIG. 12 is a section on line XII—XII of FIG. 11.

MORE DETAILED DESCRIPTION

Figure 1:
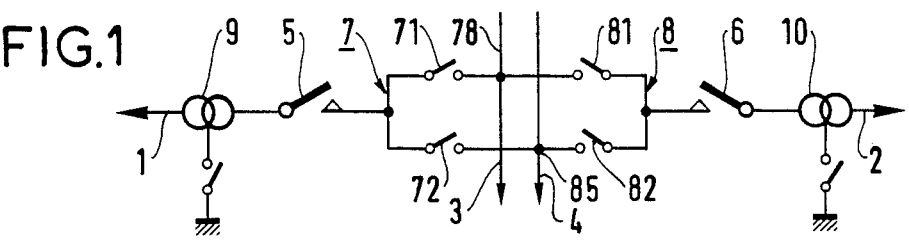
FIG. 1 is a single-wire diagram of a station having two lines and two sets of busbars.

FIG. 1 is a single-wire diagram of a hybrid outdoor electricity transmission station having two lines 1 and 2 fed by two sets of busbars 3 and 4 via circuit breakers 5 and 6 and section switches 7 and 8.

According to a special feature of the invention, the two sets of busbars are made in the form of bars within gas-tight sheaths filled with sulfur hexafluoride under pressure.

This type of busbar is designated herein by the term "metal-clad bar".

Figure 2:
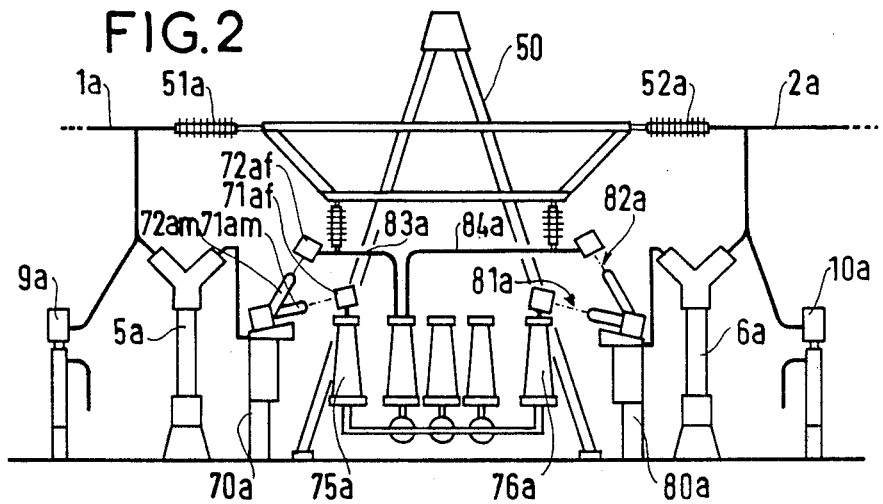
FIG. 2 and FIG. 3 are diagrams of the same station, respectively in elevation and in plan view.

The section switches are of the open air, telescopic type and each of them includes two male connectors (respectively 71, 72 and 81, 82) placed on a common support (see FIG. 2).

According to the invention, single-wire single-phase feedthroughs or two-wire single-phase feedthroughs are used.

A one-wire feedthrough 110 (FIG. 10) comprises a hollow conical ceramic insulating support 111.

The conductor 112 runs through the cone along its axis. The bottom of the cone is extended by a bulbous portion 113 for housing a winding 114 which constitutes the secondary winding of a current transformer whose primary winding is constituted by the conductor 112.

The bulbous portion is extended by a cylindrical terminal portion 115 fixed to the outer metal cladding 116 of a conductor bar 117 having sulfur hexafluoride insulation.

The conductor 112 is electrically connected and mechanically fixed to the bar.

The inside of the cone is filled with $SF_6$ since it is in communication with the metal clad bar; a part 118 provides a sealed closure for the cone.

A two-wire feedthrough 210 (see FIG. 11) comprises a hollow insulating conical support 211 extended by a bulbous portion 213 and by a cylindrical portion 215 connected to the metal cladding 216 of an $SF_6$ insulated bar 217.

Two coaxial conductors 212a and 212b are located inside the conical portion, with the conductor 212a being solid and the conductor 212b being tubular.

The diameter of the bulbous portion 213 is large enough to receive two windings 214a and 214b which surround respective ones of the conductors 212a and 212b (which are separate) at this point, in order to constitute two current transformers therewith. The two conductors reunite coaxially in the passage through the cylindrical portion 215 and they are fixed mechanically and connected electrically to the bar 217.

The cone is filled with $SF_6$ at the same pressure as the metal-clad bar 216–217 and is closed in sealed manner by a part 218.

Figure 3:
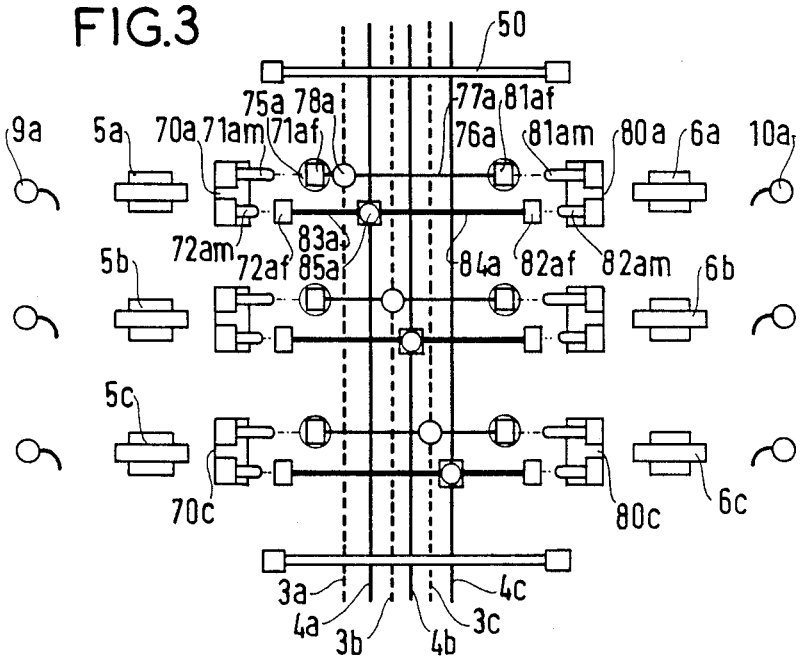

FIGS. 2 and 3 are three-phase diagrams in which indices a, b, and c designate three respective phases.

The lines 1 and 2 are supported by insulators fixed to a single gantry 50 standing astride of the station. Only phases 1a and 2a are visible in FIG. 2, as are insulators 51a and 52a.

The lines are connected by conventional, closed type circuit breakers (respectively 5a, 5b, 5c and 6a, 6b, 6c) to two-wire, open air type section switches 7 and 8 (71a, 71b, 71c; 72a, 72b, 72c; 81a, 81b, 81c; 82a, 82b, 82c).

The male portions 71am (71bm, 71cm), 72am (72bm, 72cm) of the section switch are carried by the support columns 70a (70b, 70c).

Similarly, the male portions 81am (81bm, 81cm), 82am (82bm, 82cm) of the section switch 8 are carried by the support columns 80a (80b, 80c).

The female portions 72af, 72bf, 72cf of section switch 72a (72b, 73c) and the female portions 82af, 82bf, 82cf of section switch 82a (82b, 82c) are fixed to the gantry 50.

The female portions 71af, 71bf, 71cf are fixed to respective top portions of single-wire insulating feedthroughs (of the type shown in FIG. 10) 75a, 75b, 75c.

Similarly, the female portions 81af, 81bf, 81cf are fixed to respective top portions of single wire insulating feedthroughs 76a, 76b, 76c.

A length of metal-clad bar 77a (77b, 77c) interconnects the feedthroughs. These lengths are connected to respective metal-clad bars 3a, 3b, and 3c constituting the first outlet. The points where the metal-clad bars are interconnected in pairs are referenced 78a, 78b, and 78c.

The female connectors 72af, 82af (72bf, 82bf, 72cf, 82cf) fixed to the gantry are electrically connected to metal-clad bars 4a (4b; 4c) constituting the second outlet, via air-insulated conductors 83a (83b, 83c) and 84a (84b, 84c) connected to two-wire feedthroughs (of the type shown in FIG. 11) 85a (85b, 85c).

References 9a, 9B, 9C, and 10a, 10b, and 10c designate voltage transformers with grounding for measurement and signaling purposes.

By virtue of the above combination of conventional apparatuses (closed type circuit breakers), two-wire telescopic, open air type section switches, one-wire and two-wire feedthroughs, and metal-clad bars, it is possible to make a hybrid type of outdoor transmission station which is more compact than a prior art outdoor transmission station while nevertheless leaving sufficient room for maintenance to be easy and without danger, and which makes it possible to ensure that open circuits remain visible.

Compared with a conventional outdoor transmission station, size reductions are close to 15% in length and 50% in width, corresponding to a saving of about 60% in area.

Figure 4:
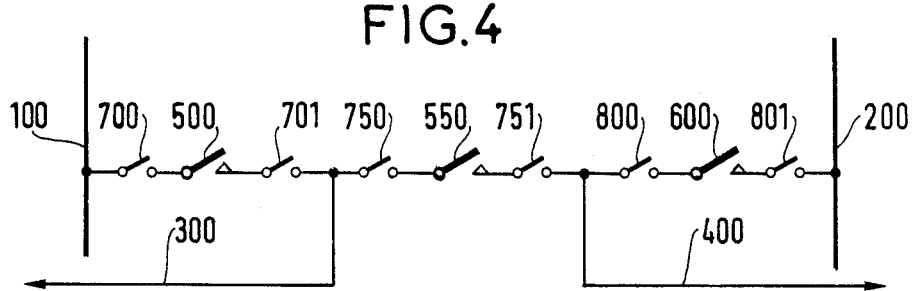
FIG. 4 is a single-wire diagram of a station of the so-called "breaker and a half" type, having two lines and two outlets.
Figure 5:
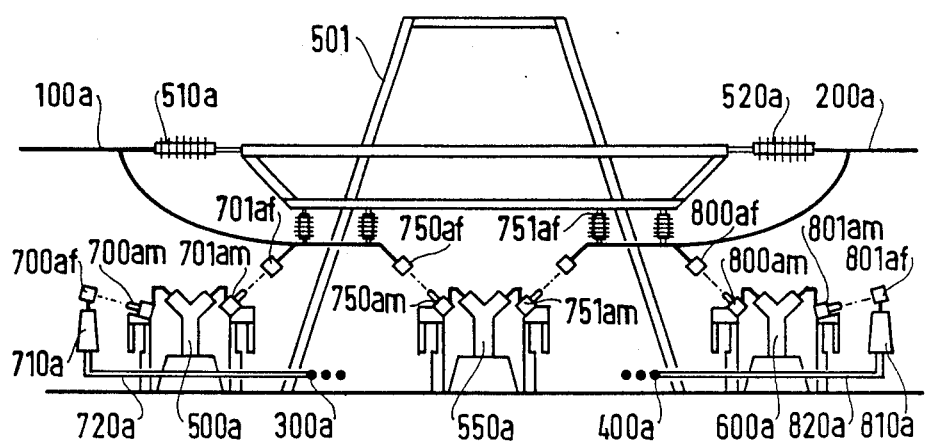
FIGS. 5 and 6 are diagrams of the same station respectively in elevation and in plan view.
Figure 6:
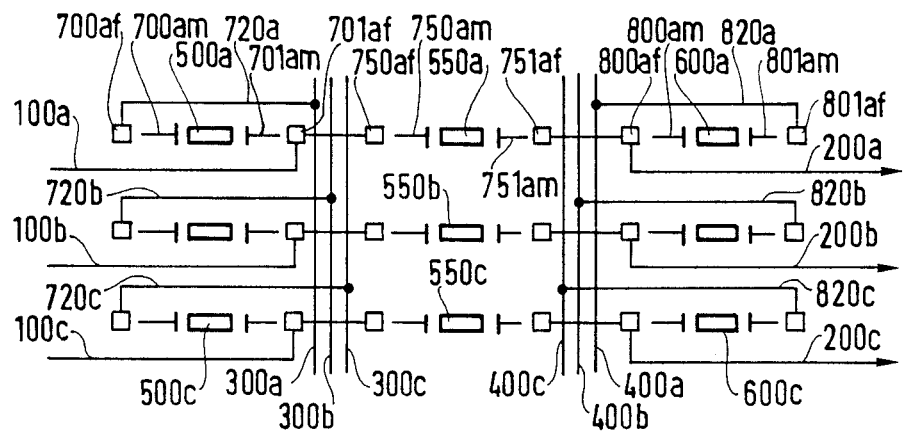

FIG. 4 is a diagram of a so-called "breaker and a half" hybrid outdoor transmission station having two sets of busbars 100 and 200, two outlets 300 and 400, and three circuit breakers 500, 550, and 600 each of which is disposed between a pair of section switches, respectively referenced 700, 701; 750, 751; 800, 801.

The station comprises a single gantry 501 to which the wires 100a (100b, 100c) of the line 100 are fixed via insulators 510a (501b, 510c) and the wires 200a (200b, 200c) of the line 200 are fixed via insulators 520a (520b, 520c).

The section switches are telescopic having a single male contact per support.

Support 710a of phase a of section switch 700 supporting female contact 700af is a single-wire insulating feedthrough (of the type shown in FIG. 10) connected by a metal-clad bar to a metal-clad 300a constituting phase a of outlet 300.

Female connectors 701af (701bf, 701cf), 750af (750bf, 750cf), 751af (751bf, 751cf) and 800af (800bf, 800cf) of section switches 701, 750, 751, and 800 are fixed to the gantry 501.

The corresponding male conductors 701am (701bm, 701cm), 750am (750bm, 750cm), 800am (800bm, 800cm), and 801am (801bm, 801cm) are fixed on insulating supports and are appropriately connected to the various poles of the circuit breakers 500a (500b, 500c), 550a (550b, 550c), and 600a (600b, 600c).

The female connectors 801af (801bf, 801cf) of section switch 800 are placed on single-wire feedthroughs (FIG. 10 type) 810a (810b, 810c) connected via lengths of metal-clad bar 820a (820b, 820c) to metal-clad bars 400a (400b, 400c) constituting the second set of busbars.

Hereagain, the hybrid design of the station achieves the results specified at the beginning of this specification.

Figure 7:
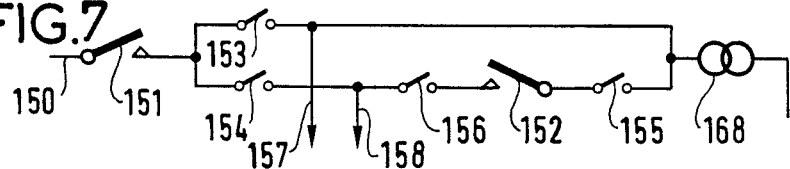
FIG. 7 is a single-wire diagram of a coupling station.
Figure 8:
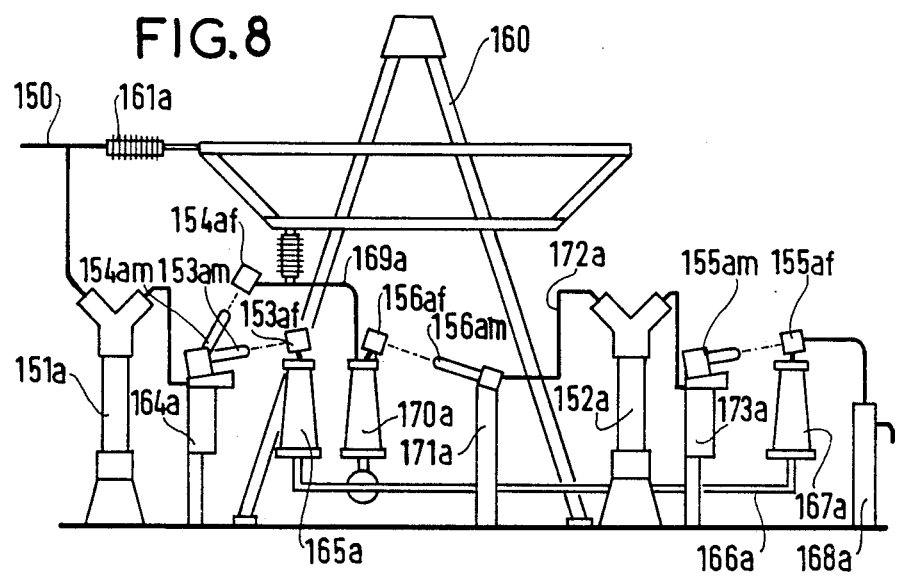
FIGS. 8 and 9 are diagrams of the same station respectively in elevation and in plan view.
Figure 9:
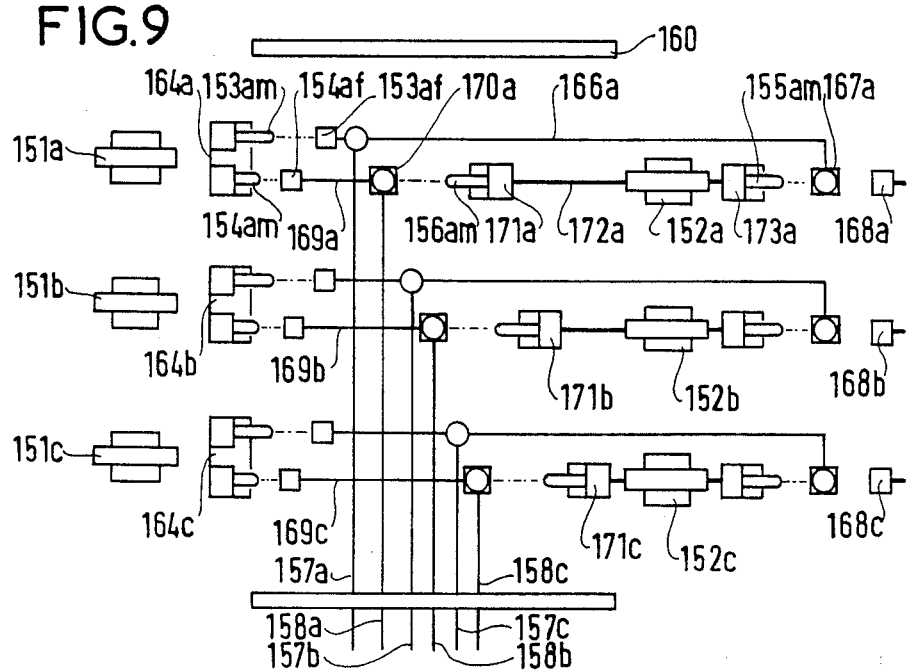

The invention is also applicable to a hybrid outdoor transmission coupling station (FIG. 7) comprising a line 150, two circuit breakers 151 and 152, four section switches 153, 154, 155 and 156, and two outlets 157 and 158.

A single gantry 160 having insulators 161a (161b, 161c) carrying the line conductors 150a (150b, 150c) also serves to support the female connectors 154af (154bf, 154cf) of section switch 154.

The support 164a (164b, 164c) of the male connector 154am (154bm, 154cm) of said section switch 154 is also the support for the male connector 153am (153bm, 153cm) of section switch 153.

The above-specified male connectors are connected to the poles of circuit breaker 151a (151b, 151c) which are themselves connected to the line via air-insulated conductors.

The female connectors 153af (153bf, 153cf) are carried by FIG. 10 type single-wire insulating feedthroughs 165a (165b, 165c) which are connected firstly to metal-clad bars 157a (157b, 157c) constituting the first outlet and secondly, via lengths of metal-clad bar 166a (166b, 166c), to two-wire insulating feedthroughs 167a (167b, 167c) carrying the female connectors 155af (155bf, 155cf) of section switch 155 and connected to voltage transformers 168a (168b, 168c).

The female connectors 154af (154bf, 154cf) of the section switch carried by the gantry are connected by air insulated conductors 169a (169b, 169c) to FIG. 11 type two-wire feedthroughs 170a (170b, 170c).

These feedthroughs carry the female connectors 156af (156bf, 156cf) of section switch 156 and are electrically connected to metal-clad bars 158a (158b, 158c) constituting the second outlet.

Male conductors 158a (158b, 158c) of the telescopic section switch 158 are carried by insulating supports 171a (171b, 171c).

The conductors are connected by air-insulated conductors 172a (172b, 172c) to the poles 152 (152b, 152c) of circuit breaker 152.

These poles are also connected by the conductors to the male connectors 155am (155bm, 155cm) of section switch 155, which are carried by insulating supports 173a (173b, 173c).

Hereagain, the use of connections between metal-clad bars and telescopic section switches makes it possible to provide a hybrid station having the desired qualities.

We claim:

1. A hybrid outdoor electricity transmission station for coupling at least one air-insulated electric transmission line to output feedthroughs, through a circuit including at least one circuit breaker series connected with at least one section switch by means of at least one set of three phase busbars, the improvement wherein said circuit breakers are of outdoor type, said section switches are of telescopic, open air type, and said at least one set of busbars is of the metal-clad type including a sheath containing dielectric gas under pressure.

2. A hybrid outdoor electricity transmission station according to claim 1, wherein said station includes a single central gantry disposed over the set of metal-clad bars, and wherein said at least one air-insulated electric transmission line includes anchor points fixed on either side of said single central gantry.

3. A hybrid outdoor electricity transmission station according to claim 1, wherein said set of metal-clad bars are connected to female connectors of said telescopic outdoor type section switches via gas-tight insulating feedthroughs fixed to the sheaths of the metal-clad bars and in communication with the sheaths.

4. A hybrid outdoor electricity transmission station according to claim 3, wherein said feedthroughs serve as supports for a female connector of said section switches and includes an axial conductor which is electrically connected to one of the metal-clad bars.

5. A hybrid outdoor electricity transmission station according to claim 4, wherein at least one of the output feedthroughs includes a second conductor coaxial with the first conductor and connected to the metal-clad bar.

6. A hybrid outdoor electricity transmission station according to claim 4, wherein the feedthroughs each includes a bulbous portion receiving a winding surrounding the axial conductors and constituting a current transformer therewith.

* * * * *